(12) United States Patent
Wu et al.

(10) Patent No.: US 7,203,426 B2
(45) Date of Patent: Apr. 10, 2007

(54) OPTICAL SUBASSEMBLY OF OPTICAL TRANSCEIVER

(75) Inventors: Enboa Wu, Taipei (TW); Ying-Ching Shih, Taipei (TW)

(73) Assignee: National Taiwan University, Taipei (TW)

( * ) Notice: Subject to any disclaimer, the term of this patent is extended or adjusted under 35 U.S.C. 154(b) by 21 days.

(21) Appl. No.: 11/144,720

(22) Filed: Jun. 4, 2005

(65) Prior Publication Data

US 2006/0274999 A1 Dec. 7, 2006

(51) Int. Cl.
*H04B 10/00* (2006.01)

(52) U.S. Cl. ............... 398/135; 359/196; 359/198; 359/200; 359/212; 359/223; 359/225; 359/226

(58) Field of Classification Search ............ 385/18, 385/92, 15, 16, 17; 398/139; 372/101
See application file for complete search history.

(56) References Cited

U.S. PATENT DOCUMENTS

| | | | |
|---|---|---|---|
| 5,774,604 A * | 6/1998 | McDonald ............ | 385/18 |
| 6,430,332 B1 * | 8/2002 | Laor et al. ............ | 385/18 |
| 6,722,793 B2 * | 4/2004 | Althaus et al. ......... | 385/92 |
| 6,731,882 B1 * | 5/2004 | Althaus et al. ......... | 398/139 |
| 6,999,493 B2 * | 2/2006 | Kaneko ............... | 372/101 |

OTHER PUBLICATIONS

U.S. Appl. No. 10/971,462, filed Oct. 22, 2004, Enboa Wu et al.

* cited by examiner

*Primary Examiner*—Frank G. Font
*Assistant Examiner*—Guy G. Anderson

(57) ABSTRACT

A transceiver module comprised of a multiplexing/demultiplexing optical subassembly is provided. The optical subassembly includes either a transmitter module or a receiver module or both. The transmitter module has laser diodes emitting optical signals, which are reflected by reflectors, and coupled together by thin film filter. The receiver module includes thin film filters that decouple a received optical signal into constituent components. These components are reflected by reflectors to photo detectors by which the optical signals are converted into electrical signals. The reflector are capable of dual axis adjustment for adjustment of inclination thereof to effect active alignment. Further, the transmitter module and the receiver module define positioning recesses to position the laser diodes and photo detectors. The recesses are sized in accordance with the wavelengths associated with the laser diodes and photo detectors to effect passive alignment.

27 Claims, 7 Drawing Sheets

OPTICAL SUBASSEMBLY OF OPTICAL TRANSCEIVER

BACKGROUND OF THE INVENTION

1. Field of the Invention

The present invention relates generally to an optical transceiver module, and in particular to an optical subassembly of the optical transceiver module, featuring small size, high precision alignment, and excellent coupling efficiency.

2. The Prior Arts

Optical fiber transmission is instrumental in the development of many advanced applications for telecommunications and data communications. This high bandwidth transmission needs local fiber access to provide two-way communications to the home through an optical transceiver, which is composed of a driver circuit, an electrical subassembly (ESA), and an optical subassembly (OSA). Operation frequency plays a critical role in determining the transmission speed. Conventionally, high speed transmissions up to 10 Gb/sec, 40 Gb/sec, or even higher, is realized by increasing the operation frequency of the transmitter driver circuit, which inevitably leads to a significant increase of manufacturing costs.

Wavelength Division Multiplexing (WDM) was developed to enhance the transmission speed of optical fiber system without undesirably increasing the operation frequency and thus effectively limiting the increase of manufacturing costs. The WDM solution allows an optical transceiver to multiplex a plurality of optical signals of different wavelengths onto a "mixed" signal that can travel along a single optical fiber. Such a "mixed" signal, once reaching a destination receiver, is demultiplexed and separated with the constituent component of the desired wavelength retrieved. In other words, the WDM technology optimizes the utilization of transmission bandwidth by permitting simultaneous transmission of optical signals of different wavelengths over a single optical fiber. Two types of WDM are known, namely Dense Wavelength-Division Multiplexing (DWDM) and Coarse Wavelength-Division Multiplexing (CWDM), based on the minimum size of the spacing between wavelengths of the optical signals that can be composed into the single "mixed" signal.

For DWDM, the normal spacing between two bands of different wavelengths is in the range of 0.8–1.6 nm, so that unitary bandwidth can support extremely high optical signal density. C-band that operates in a bandwidth of 1525–1565 nm is most commonly used for long haul, MAN and LAN signal transmission. Due to the dense arrangement of optical signals in a single band, optical splitters and photo coupler modules that are employed for DWDM must be upgraded. In addition, a thermo-electric cooler (TEC) that is expensive is needed to control the operation temperature of a laser diode that emits the desired optical signals whereby microdrifting of the wavelength of the optical signals can be eliminated to ensure transmission quality. All these add to the manufacturing costs, as well as power consumption.

On the other hand, Coarse Wavelength-Division Multiplexing (CWDM) arranges less optical signals in a single optical fiber, which allows for a large spacing (20 nm) between wavelengths of the optical signals. This wavelength spacing is much larger than that of the DWDM. Thus, CWDM does not require the expensive thermoelectric cooler (TEC) to reduce the operation temperature of the laser diode nor to prevent the drifting of the bandwidth.

Although CWDM has a transmission capacity lower than DWDM, such a drawback can be easily overcome by using a number of laser diodes of lower transmission speeds employing CWDM to simultaneously transmit optical signals, and a high-speed transmission device compared with DWDM can be realized. For example, to meet a transmission requirement of 10 Gb/sec, CWDM only needs several laser diodes with lower transmission speed, for example laser diodes of 3.125 Gb/sec or 2.5 Gb/sec, which by the nature thereof are more stable in signal transmission, to produce the equivalent performance as a laser diode of 10 Gb/sec. As another example, to reach up to 40 GB/sec transmission, four laser diodes of 10 Gb/sec or slightly higher baud rates together can meet the required specifications. This method can be expanded for even higher transmission bandwidths.

The use of laser diodes of the transmitter optical subassembly (TOSA) with lower transmission speeds allows the sensing area of the corresponding photo diodes on the receiver optical subassembly (ROSA) to be increased. Therefore, the alignment tolerance is less critical and the coupling efficiency between optical signals and optical fiber can be improved.

Also, using laser diodes with lower transmission speeds makes the design for the electrical subassembly (ESA) and driver circuit less critical, but the more challenging part is the design of the optical subassembly (OSA), which is to combine optical signals of different wavelengths and couple them onto a single optical fiber (the part of TOSA), or to separate multiplexed optical signals on the receiver end of the optical fiber into optical wavelength signals to respective photo detectors (the part of ROSA), and at the same time the design spec has to meet the Multi Source Agreement (MSA) and the module miniaturization.

Coupling efficiency for a number of optical signals of different wavelengths is of vital importance in reducing signal loss in optical transmission and in reducing the misalignment among each component. Passive alignment is commonly employed to simplify the manufacturing process. The passive alignment is done by forming a mating portion on the body of an optical subassembly. The mating portion is machined with high precision. An optical device with a counterpart mating portion, which is also precisely machined, is inter-engaging with the mating portion of the body. Since both mating portions are of high machining precision, the coupling efficiency is enhanced. However, since machining precision is subject to limitation, the improvement of coupling efficiency is also subject to limitation. Thus, for precise alignment, the mating means must be of extremely high manufacturing precision and this inevitably complicates the manufacturing process and increases the manufacturing costs.

On the other hand, an active alignment technique allows for adjustment of the position of an optical device with respect to an optical transmitter or receiver in order to obtain an optimum coupling therebetween after the optical device is mounted to the transmitter or receiver. An example of active alignment is illustrated in U.S. patent application Ser. No. 10/971,462 and its Taiwanese counterpart, Taiwan Patent Application No. 93118803. The coupling efficiency can be optimized by means of the after-mounting adjustment and flexibility can be provided for manufacturing/assembling of the optical transmitter and receiver.

For an optical transmitter or receiver that transmits or receives a number of optical signals of different wavelengths, a number of laser diodes or photo detectors. Each laser diode or photo detector must have an individual base for independent adjustment, which leads to a bulky size of the optical transmitter or receiver.

Thus, the present invention is aimed to provide an optical subassembly that overcomes the above-discussed drawbacks of the conventional optical subassemblies.

SUMMARY OF THE INVENTION

Thus, an objective of the present invention is to provide an optical transceiver module featuring both passive alignment and active alignment so that poor alignment precision of laser diodes and photo detectors in the conventional optical subassembly can be eliminated and effectively enhancing coupling efficiency of the optical subassembly.

Another objective of the present invention is to provide an optical transceiver module having a simple and compact structure for miniaturization of the optical transceiver module.

In accordance with the present invention, to realize the above objectives, an optical transceiver module comprised of a multiplexing and demultiplexing optical subassembly is provided. The optical subassembly comprises either a transmitter module or a receiver module or both. The transmitter module comprises four laser sources, respectively giving off optical signals of different wavelengths, which after collimated, are reflected by respective reflectors to the same plane on which the optical signals are coupled together by means of thin film filters, which coupled signal is then transmitted through an optical fiber. The receiver module comprises thin film filters that decouple a received optical signal into constituent components. These components are reflected by respective reflectors to photo detectors by which the optical signals are converted into corresponding electrical signals. The reflectors are capable of dual axis adjustment for adjustment of inclination thereof to effect active alignment. Further, the transmitter module and the receiver module comprise a body in which positioning recesses of predetermined dimension are formed to receive and position the laser diodes and photo detectors. The dimensions of the recesses are determined in accordance with the wavelengths associated with the laser diodes or photo detectors thereby effecting passive alignment. Thus, both passive alignment and active alignment can be done for the optical module of the present invention to optimize the coupling efficiency.

The present invention will become more obvious from the following description when taken in connection with the accompanying drawings, which show, for purposes of illustration only, preferred embodiments in accordance with the present invention. In the drawings:

DETAILED DESCRIPTION OF THE PREFERRED EMBODIMENT

A preferred embodiment of the present invention will be described with reference to the attached drawings for explanation of the structure and function of an optical subassembly constructed in accordance with the present invention. It is, however, noted that the optical subassembly of the present invention can be embodied in both an optical transmitter module and an optical receiver module and an optical module that simultaneously comprises an optical transmitter module and an optical receiver module, such as an optical transceiver module. In the following, a description with respect to an optical receiver module will be given first.

Figure 1:
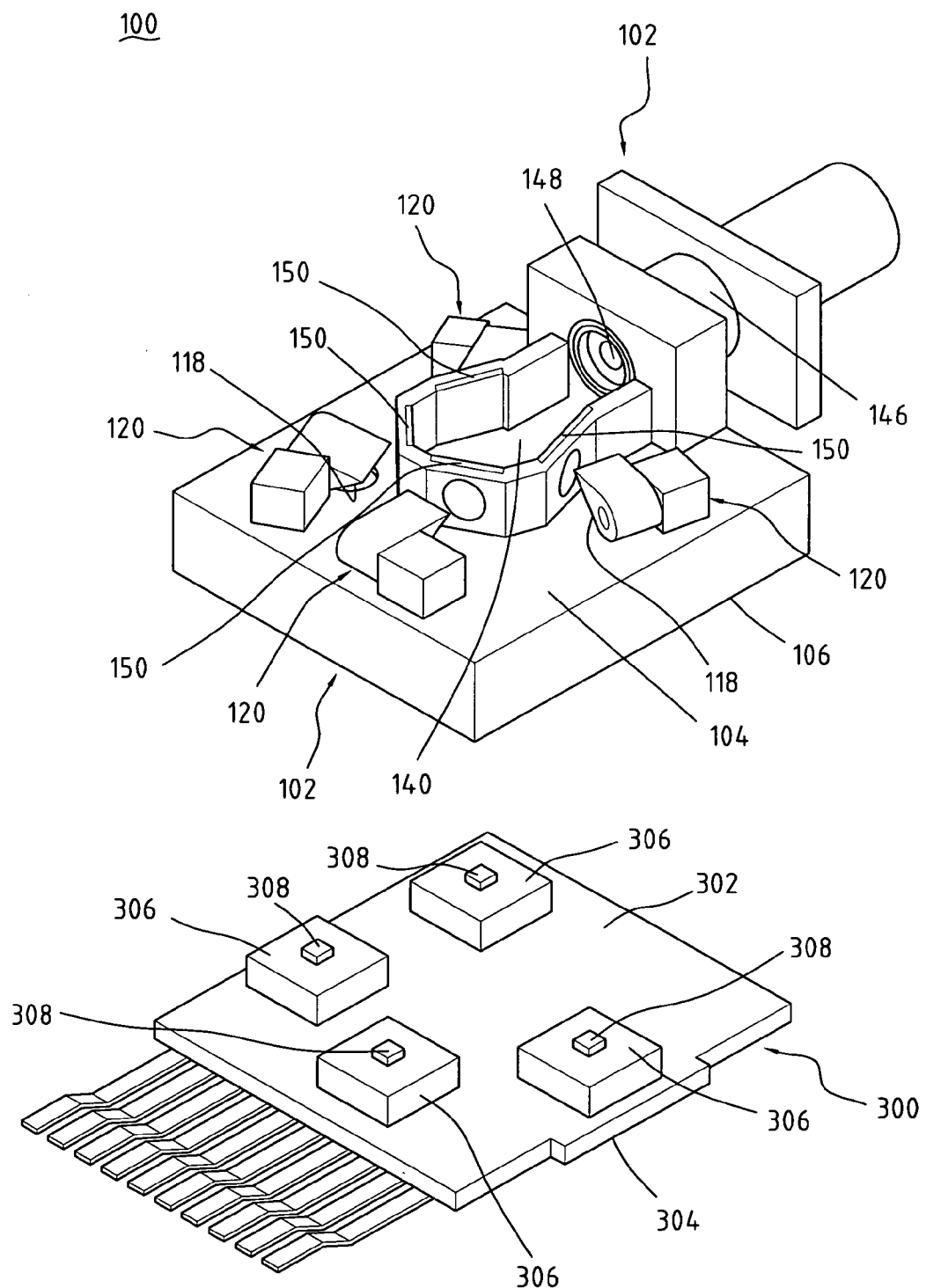
FIG. 1 is an exploded view of an optical subassembly constructed in accordance with the present invention, which is embodied as an optical transmitter module.

With reference to the drawings and in particular to FIG. 1, which shows an exploded view of an optical subassembly constructed in accordance with the present invention embodied in an optical transmitter module, which is broadly designated with reference numeral 100, the optical transmitter module 100 comprises a body 102 having top and bottom surfaces 104, 106. A light source generation device 300 is mounted to the bottom surface 106 of the body 102.

Figure 2:
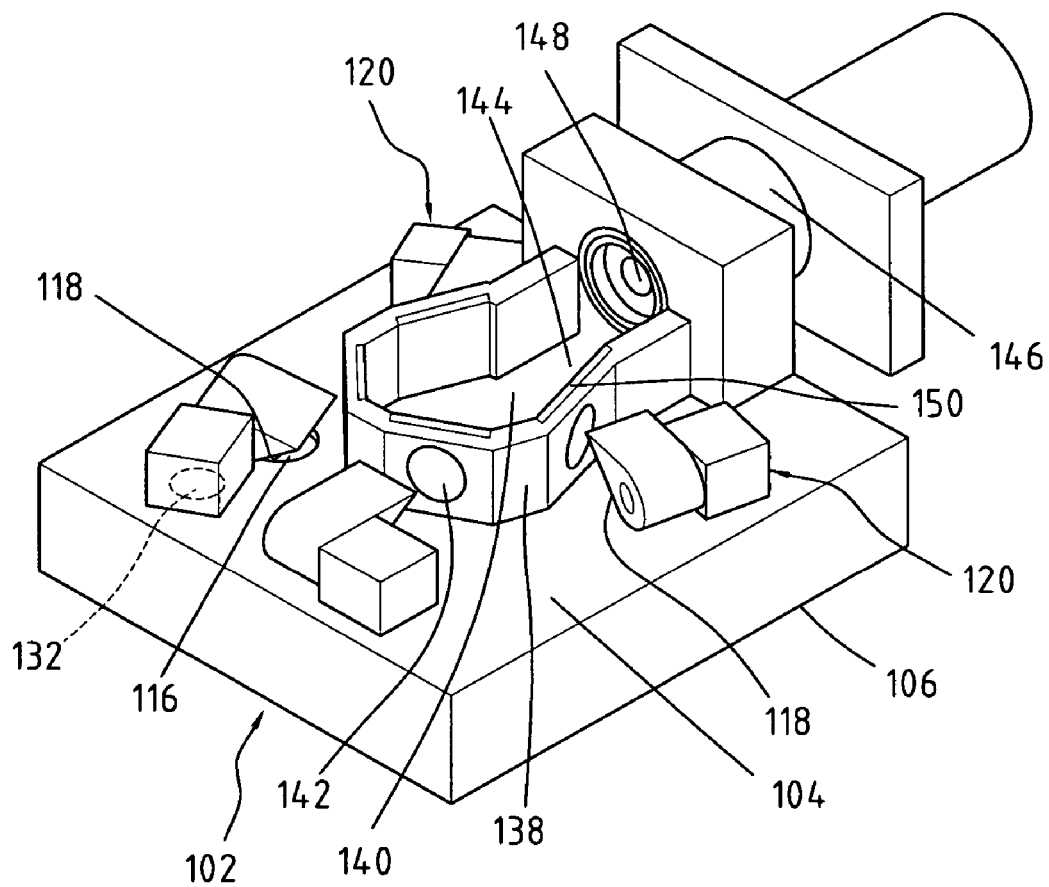
FIG. 2 is a perspective view of a body of the optical transmitter module of the present invention.
Figure 3:
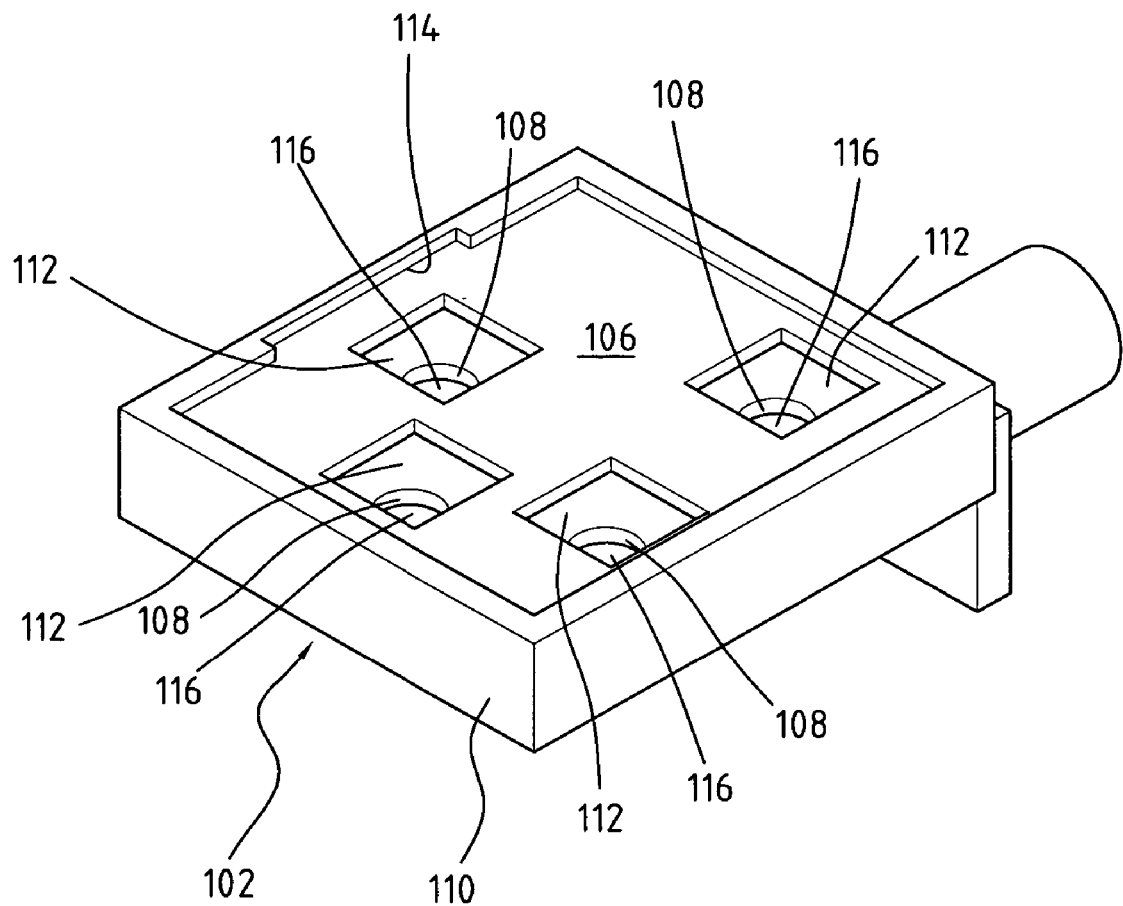
FIG. 3 is another perspective view of the body of the optical transmitter module taken from a bottom side of the body.

Also referring to FIGS. 2 and 3, which show perspective views of he body 102 from top and bottom sides, respectively, in the embodiment illustrated, the body 102 comprises a flat body of which the top and bottom surfaces 104, 106 are opposite to and substantially parallel to each other with bores 108 extending through the flat body and running between the top and bottom surfaces 104, 106. The number of the bores 108 is four in the embodiment illustrated, but it can be other numbers such as eight. Each bore 108 is substantially normal to the top and bottom surfaces 104, 106 and extending from the top surface 104 to the bottom surface 106. The bores 108 serve as passageways for light beams, which will be further described.

The bottom surface 106 has a periphery along which a circumferential flange 110 is formed. The flange 110 and the bottom surface 106 together form a space for receiving the light source generation device 300. Inboard the area surrounded by the circumferential flange 110, the bottom surface 106 defines a positioning recess 112 corresponding to each bore 108. The positioning recesses 112 are defined in the bottom surface 106 but not extending to the top surface 104, while the bores 108 extend completely through the body 102 from the bottom surface 106 to the top surface 104. As mentioned above, four bores 108 are defined in the body 102 and thus, four positioning recesses 112 are defined in the bottom surface 106.

The light source generation device 300 comprises a base 302, which is comprised of a circuit board on which a control circuit is formed. The base 302 is shaped and sized in correspondence with to the receiving space defined by the circumferential flange 110 of the bottom surface 106 of the body 102 and is thus snugly received in the receiving space. The base 302 is secured in the receiving space with suitable means, such as a notch 114 defined in an inside surface of the circumferential flange 110 and a projection 304 formed along an edge of the base 302 and press-fit or force-fit into the notch 114 to secure the base 302 to the bottom surface 106 of the body 102. Other means, such as adhesives that fix the base 302 inside the circumferential flange 110, may also be employed. Since this is generally known to those having ordinary skills, no further detail is needed herein.

The light source generation device 300 comprises a light generator 306 corresponding in position to each positioning recess 112. The light generator 306 has a shape and size receivable in the corresponding positioning recess 112. Each light generator 306 comprises a light source 308, such as a laser diode, which emits a laser beam. The laser diodes 308 are positioned to align with the bores 108 respectively whereby the laser beams emitted from the laser diodes 308 are allowed to travel through the bore 108 and reaching the top surface 106 of the body 102.

In the embodiment illustrated, a collimating device 116 is arranged at a suitable location inside or above each bore 108. The collimating device 116 collimates the laser beam emitted from the laser diode 308 and thus is generally spaced from the laser diode 308 at a suitable distance for collimating and thus forming parallel beam of the laser beam from the laser diode 308. The collimating device 116 may be comprised of a single lens, such as a ball lens or an aspheric lens, or a combination of a number of lenses. To simplify the description hereafter, the collimating device 116 may be interchangeably replaced the term "lens". The lens or lenses of the collimating device 116 may be coated with a wavelength-selecting anti-reflection optical film to reduce reflection loss. This is also familiar to those having ordinary skills in the art of optics and thus no further detail is needed herein.

The lens or lenses that constitute the collimating device 116 can be fixed inside or above the bore 108 of the body 102 by light-curable adhesives, such as ultra-violent curable adhesives, heat-curable adhesives, or other adhesives. Alternatively, glass-to-metal sealing technique can be employed to fix the collimating device 116 to the body 102. Another alternative is the molded the lens or lenses of the collimating device 116 with the body 102 if the body 102 is made of plastic injection molding.

Figure 4:
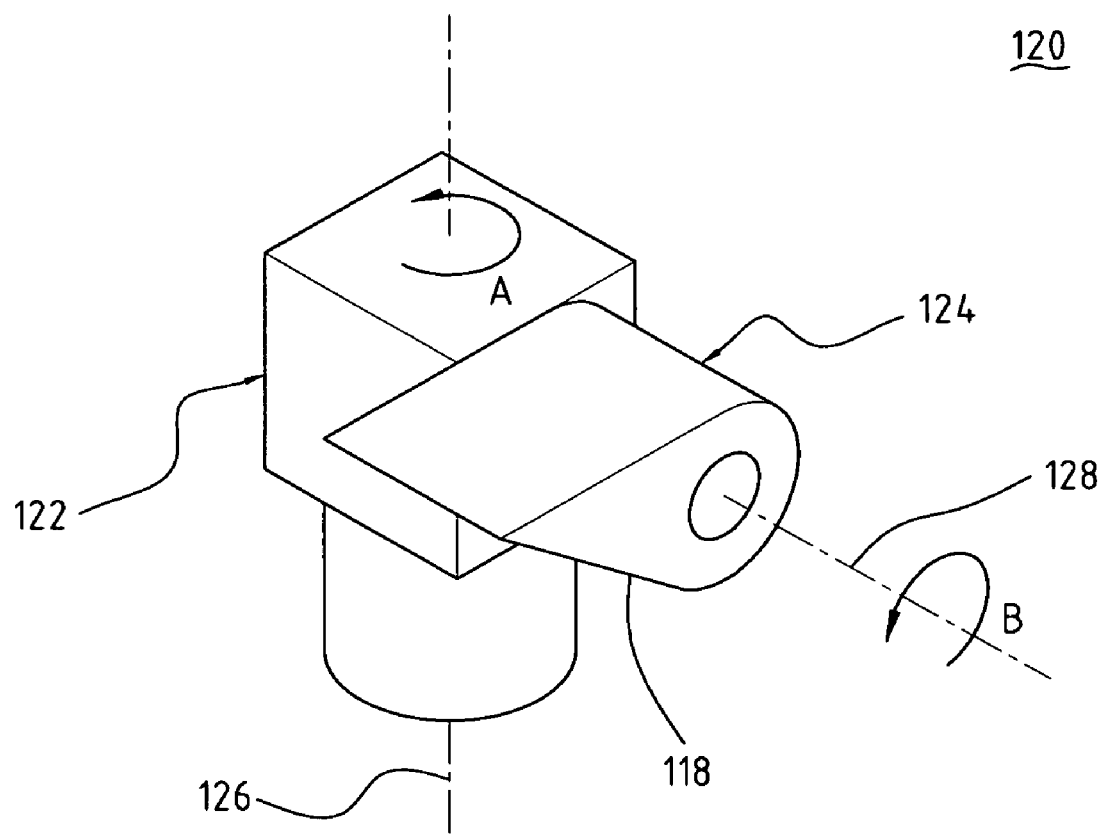
FIG. 4 is a perspective view of an adjustor of the optical subassembly in accordance with the present invention.
Figure 5:
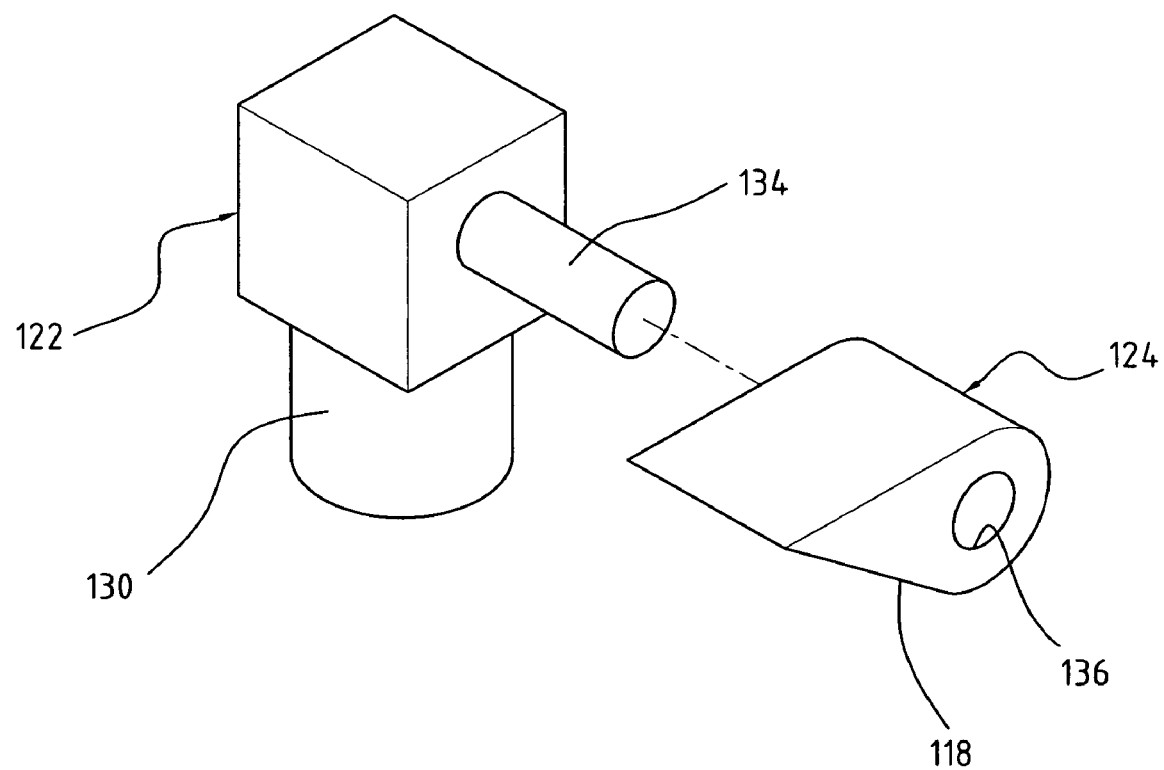
FIG. 5 is an exploded view of the adjustor of the present invention.

Also referring to FIGS. 4 and 5, a reflector 118 corresponding in position to the bore 108 and aligning with each collimating device 116 is mounted to the top surface 104 of the body 102. The reflector 118 comprises a reflection surface that is inclined at an inclination angle with respect to a central axis of the corresponding bore 108 to reflect the light beam traveling through the bore 108 to a desired direction, which will be further described hereinafter. In accordance with the present invention, each reflector 118 is mounted to the top surface 104 of the body 102 in an adjustable manner by an adjustor 120, which features active alignment. In the embodiment illustrated, the adjustor 120 comprises a first adjusting member 122, serving as a vertical adjusting element, and a second adjusting member 124, serving as a horizontal adjusting element. The reflector 118 is mounted to the second adjusting member 124. The reflector 118 can be integrally formed with the second adjusting member 124 or the reflector 118 is a separate part externally attached to the second adjusting member 124. The first and second adjusting members 122, 124 are rotatable about respectively rotation axes 126, 128, as indicated by arrows A, B of FIG. 4, for adjustment of the orientation of the reflector 118 and thereby changing the direction along which the laser beam is reflected by the reflector 118 for realizing active alignment.

In the embodiment illustrated, the first adjusting member 122 comprises a first cylinder 130, having a central axis coincident with the rotation axis 126 of the first adjusting member 122 to serve as a pivot for the first adjusting member 122. The first pivot 130 is rotatably fit into a circular hole 132 that is defined in the top surface 104 of the body 102 at a location adjacent the bore 108 whereby the adjustor 120 is mounted on the top surface 104 in such a manner that the adjustor 120 is rotatable about the rotation axis 126. In the embodiment illustrated, the rotation axis 126 is substantially normal to the top surface 104 and thus the first adjusting member 122, which features adjustment of the adjustor 120 about a vertical axis, is rotatable about an axis that is perpendicular to the top surface 104. However, it is apparent that the rotation axis 126 is not necessarily perpendicular to the top surface 104, and can be inclined with respect to the vertical direction at any desired angle. The adjustor 120 comprises a second pivot 134 coincident with the rotation axis 128 about which the second adjusting member 124 is rotatable. In this respect, the second adjusting member 124 forms a bore 136 into which the second pivot 134 rotatably fits. Thus, the second adjusting member 124 is rotatable about the rotation axis 128 with respect to the first adjusting member 122. Alternatively, a bore can be defined in the first adjusting member with a central axis of the bore perpendicular to the rotation axis of the first adjusting member and the second adjusting member 124 comprises a pivot extending therefrom and fit into the bore, which realizes relative rotation of the second adjusting member 124 with respect to the first adjusting member 122.

In the embodiment illustrated, the second pivot 134 is substantially parallel to the top surface 104 of the body 102 and thus the second adjusting member 124, which features adjustment of the reflector 118 about a horizontal axis, is rotatable about a rotation axis parallel to the top surface 104. It is apparent that the second rotation axis 128 is not necessarily parallel to the top surface 104 and can be inclined with respect to the top surface 104 at any desired angle. However, it is noted that the second pivot 134 is better not parallel to the first pivot 130 in order ensure rotation adjustment of the reflector 118 about two non-parallel axes. In the embodiment illustrated, the rotation axis 126 of the first pivot 130 is substantially normal to the rotation axis 128 of the second pivot 134.

The rotatability of the first and second adjusting members 122, 124 about respective rotation axes 126, 128 with respect to the body 102 allows for the adjustment of the position and orientation of the reflector 118 with respect to the top surface 104 of the body 102, thereby realizing active alignment of the reflector 118. This will be further described.

Although in the embodiment illustrated, the position and the orientation of the reflector 120 are adjustable by the rotation about the first and second pivots 130, 134, it is also possible to carry out adjustment of the reflector 118 by means of rotation about a single pivot.

In practice, friction of predetermined magnitude is present between the first pivot 130 and the hole 132 of the body 102, and also present between the second pivot 134 and the bore 136 of the second adjusting member 124. The friction helps retaining relative positions among the first adjusting member 122, the second adjusting member 124, and the body 102 after the adjustment of the first and second adjusting members 122, 124 is done by rotating the members 122, 124 about the first and second pivots 130, 134. If necessary, the first and second adjusting members 122, 124 can be further secured by means of for example adhesives applied between the first adjusting member 122 and the second adjusting member 124, and between the body 102 and the first adjusting member 122, or resistance welding or laser welding can be employed to permanently secure the members 122, 124 on the top surface 104 of the body 102.

A wall 138, comprised of a number of sections, is formed on the top surface 104 of the body 102, which wall delimits an internal space 140 having four inner faces each defining a through hole 142 corresponding in position to each reflector 118 whereby the laser beam reflected by the reflector 118 travels in a direction directly through the through hole 142 to enter the internal space 140. A passage 144 is formed in the wall 138 and in communication with the internal space 140. A receptacle or connector 146 is fixed to the body 102 in front of the passage 144 for releasable connection with an external optical fiber (not shown) through which optical signals are received by and transmitted from the optical subassembly 100 of the present invention. A passage lens 148 is mounted in the receptacle 146 to guide laser beam that is transmitted from the optical subassembly 100 into the optical fiber, or to guide the laser beam that is received by the optical subassembly 100 from the optical fiber into the internal space 140 in which further processing is performed.

The receptacle 146 is fixed to the passage 144 of the body 102 by light-curable adhesive, such as ultraviolet curable adhesives, heat-curable adhesives, or other adhesives or by other known means, such as laser spot welding and resistance welding.

Further, the receptacle 146 that connects the external optical fiber can be an optical connector of any type, such as LC connector, SC connector, FC connector, or other types. This is known to those having ordinary skills of the field of optical communication and thus no further detail is needed herein.

A thin film filter 150 is attached to the inner faces of the wall 138 at a position opposing each through hole 142, which serves as a reflector in the optical transmitter module. With the reflection of the thin film filters 150, the laser beams traveling through hole 142 into the internal space 140 are reflected at least once to move in a direction through the passage 144, transmitting through the passage lens 148 to enter the optical fiber connected to the receptacle 146.

The operation of the optical transmitter module in accordance with the present invention will be described now with reference to FIG. 1. The first light generator 306 on the base 302 of the light source generation device 300 generates and emits a first laser beam of first wavelength $\lambda 1$. The first laser beam transmits through the collimating device 116 in the corresponding bore 108 of the body 102 to form a collimated parallel light beam. The collimated first laser beam is then reflected by the reflector 118 of associated adjustor 120 to run through the associated through hole 142 of the wall 138 to enter the internal space 140. The first laser beam is then reflected by the first thin film filter 150 to couple to a second laser beam, which as a wavelength of $\lambda 2$, generated by the second light generator 306 of the light source generation device 300. The combined first and second laser beams is then reflected by the second thin film filter 150 to couple with a third laser beam, which as a wavelength of $\lambda 3$, generated by the third light generator 306 of the light source generation device 300. The combined first, second, and third laser beams is then reflected by the third thin film filter 150 to couple with a fourth laser beam, which as a wavelength of $\lambda 4$, generated by the fourth light generator 306 of the light source generation device 300. The first, second, third, and fourth laser beams are thus combined as a single optical signal that passes through the passage 144 and transmits through the passage lens 148 to be coupled to the optical fiber connected to the receptacle 146. The coupling of optical signals in an optical transmitter module is known, such as that described in Taiwan Patent Application No. 93118803 of which a U.S. counterpart application bears Ser. No. 10/971,462, and thus no further detail is needed herein.

Figure 6:
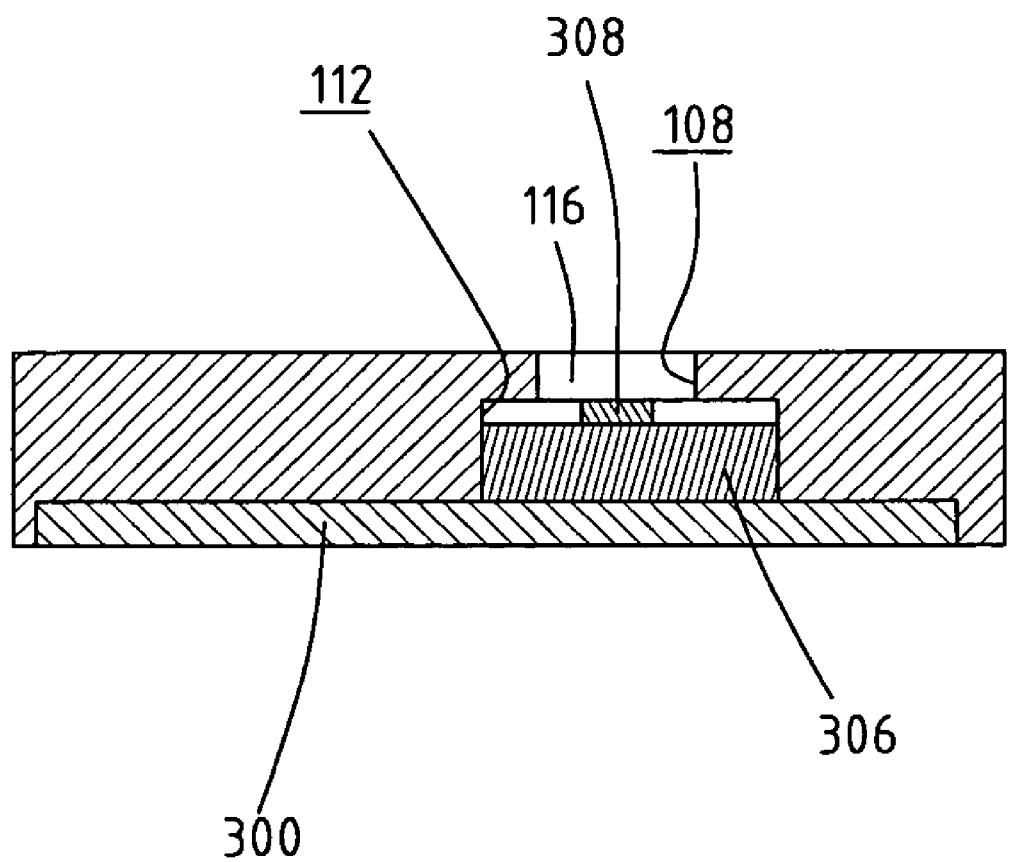
FIG. 6 is a cross-sectional view of the optical transmitter module of FIG. 1, showing spatial relationship between a light source generation device and the body of the optical transmitter module.

Also referring to FIG. 6, the optimum distance between the laser diode 308 and the collimating device 116 is different for laser beams of different wavelengths. Thus, the positioning recesses 112 of the body 102 are provided with optimum depths d1, d2, d3, and d4 when the body 102, which has a unitary structure, is manufactured. The optimum distances are different for the wavelengths of the laser beams emitted from the laser diodes 308 are different and the depths are set and corrected in advance in accordance with the wavelength of the laser beam emitted from the associated laser diode 308 whereby the laser beams that transmitted through the collimating devices 116 can be collimated by the associated collimating devices 116 with the optimum collimation result, which provides parallel laser beams. This realizes passive alignment of the optical subassembly of the present invention.

In addition to the passive alignment, the present invention also features active alignment, which is realized by the dual-axis rotation based adjustment of the adjustor 120 that adjusts the position and orientation of the associated reflector 118 to compensate error or tolerance of assembling optical devices or components, such as lens, thin film filter, receptacle, base of light source generation device. This ensures the optimum coupling efficiency of the optical subassembly in accordance with the present invention.

Figure 7:
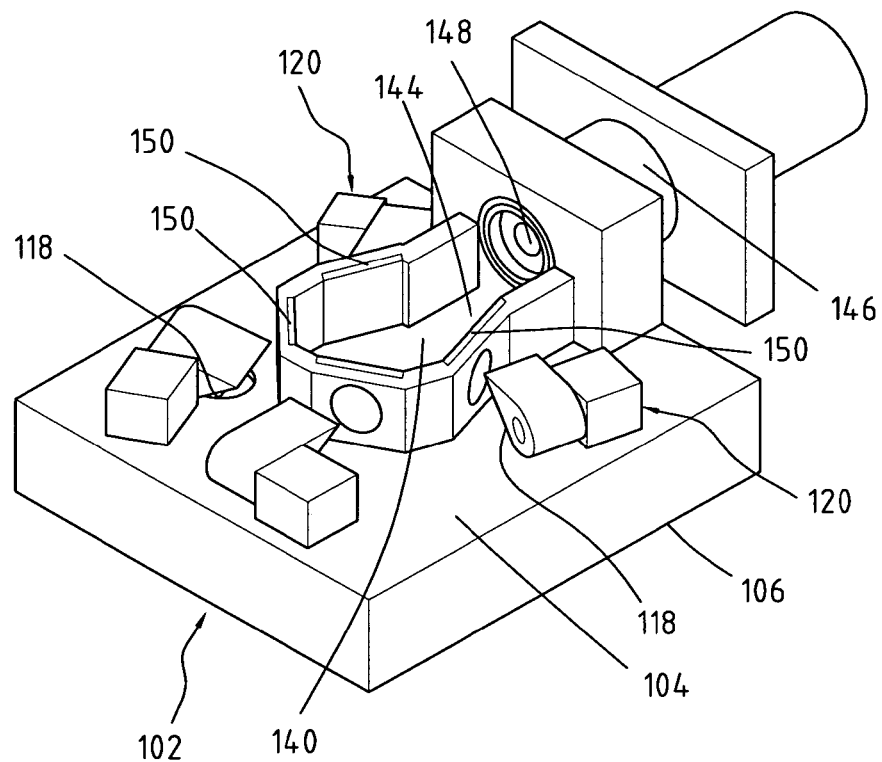
FIG. 7 is an exploded view of an optical subassembly constructed in accordance with the present invention, which is embodied as an optical receiver module.
Figure 7:
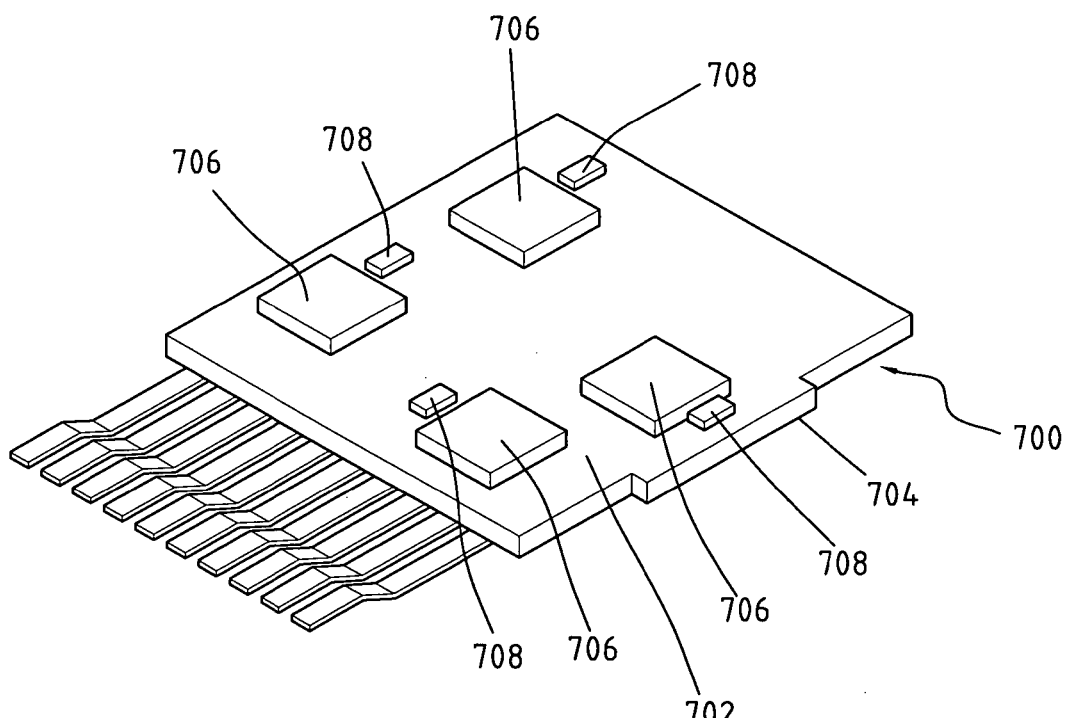

With reference to FIG. 7, a description of an optical receiver module that embodies the present invention will be given as another embodiment of the present invention. The optical receiver module of the present invention is broadly designated with reference numeral 500, which, similar to the optical transmitter module 100 that has just been described hereinabove, comprises a body having a construction identical to that of the optical transmitter module 100. Thus, the body and associated or related parts and components thereof will be designated with the same reference numerals as those in the optical transmitter module 100 and related description will be omitted for simplicity. The optical receiver module 500 comprises a photo detection device, generally designated with reference numeral 700, which takes the position of the light source generation device 300 in the above-described optical transmitter module 100. Similarly, the photo-detection device 700 is received and fixed in a receiving space below the bottom surface 106 of the body 102 and thereby mounted to the body 102 to form the optical receiver module 500 in accordance with the present invention.

The photo-detection device 700 comprises a base 702, which is comprised of a circuit board on which a control circuit is formed. The base 702 is shaped and sized in correspondence with to the receiving space defined by the circumferential flange 110 of the bottom surface 106 of the body 102 and is thus snugly received in the receiving space. The base 702 is secured in the receiving space with suitable means, such as a notch 114 defined in an inside surface of the circumferential flange 110 and a projection 704 formed along an edge of the base 702 and press-fit or force-fit into the notch 114 to secure the base 702 to the bottom surface 106 of the body 102. Similar to the optical transmitter module 100, other means, such as adhesives that fix the base 702 inside the circumferential flange 110, may also be employed to secure the photo-detection device 700 to the body 102.

The photo-detection device 700 comprises a photodetector 706 corresponding in position to each positioning recess 112 of the body 102. The photodetector 706 has a shape and size receivable in the corresponding positioning recess 112. Each photodetector 706 comprises an optical sensing element 708, such as a photo diode, which detects optical signals, such as a laser beam, and generates a corresponding electrical signal. The photo diodes 708 are positioned to align with the bores 108 respectively to detect and receive optical signal applied thereto through the bores 108.

The operation of the optical receiver module in accordance with the present invention will now be described. Optical path along which optical signals or laser beams to be received by the optical receiver module 500 travel is exactly opposite to that of the optical transmitter module 100. An optical signal comprised of a number of different wavelengths, such as first wavelength (λ1), second wavelength (λ2), third wavelength (λ3), and fourth wavelength (λ4), is transmitted into the optical receiver module 500 through an external optical fiber connected to the receptacle 146. The multiple-wavelength optical signal is transmitted through the passage lens 148, which converts the optical signal into parallel ray that is guided through the passage 144 into the internal space 140. The parallel ray is incident onto a first one of the four thin film filter 150, which separates a first light component of the optical signal that has the wavelength λ4 from the other components of the optical signal and allows the first light component to travel toward the reflector 118 of the associated adjustor 120. The reflector 118 redirects the first light component toward the associated collimating device 116, which converges the light onto the photo diode 708 of the first photodetector 706 and an electrical signal is generated by the photo diode 708 in association with the first light component.

Meanwhile, the remaining components are reflected and redirected by the first one of the thin film filters 150 to the second one of the thin film filters 150, which separate a second component of the optical signal, which has the wavelength λ3, from the optical signal. The second light component is redirected by the associated reflector 118 toward the associated collimating device or lens 116 and converged onto the photo diode 708 of the associated photodetector 706. An electrical signal in association with the light component of wavelength λ3 is generated by the photo diode 708.

The remaining components, namely wavelengths λ2 and λ1, are reflected and redirected by the second one of the thin film filters 150 to the third one of the thin film filters 150, which separates a third component of the optical signal, which has the wavelength λ2, from the optical signal. The third light component is redirected by the associated reflector 118 toward the associated collimating device or lens 116 and converged onto the photo diode 708 of the associated photodetector 706. An electrical signal in association with the light component of wavelength λ2 is generated by the photo diode 708.

The remaining component of wavelength λ1 is reflected and redirected by the third one of the thin film filters 150 to the fourth one of the thin film filters 150, through which the light component of wavelength λ1 transmits and travels toward the associated reflector 118, which redirects the light component through the associated collimating device or lens 116 and converged onto the photo diode 708 of the associated photodetector 706. An electrical signal in association with the light component of wavelength λ1 is generated by the photo diode 708. Thus, all four component of the incoming optical signal are converted into associated electrical signals, which can be subsequently processed in any desired manners.

Since the wavelengths of the four components are different, and since the difference among the optical paths along which the four components travel, the optimum distance between each collimating lens 116 and corresponding photodetector 706 is different from each other. Similar to the case of optical transmitter module 100 that was described above, the optical receiver module 500 can set the optimum depth d1, d2, d3, and d4 of the positioning recesses 112 in advance for passive alignment. Also, the optical receiver module 500 of the present invention allows for dual-axis rotation based adjustment of the adjustor 120 that adjusts the position and orientation of the associated reflector 118 to compensate error or tolerance of assembling optical devices or components, such as lens, thin film filter, receptacle, base of light source generation device, whereby active alignment is realized. The capability of both passive and active alignments effectively compensates errors or tolerances caused in assembling process of the receiver module and ensures the optimum coupling efficiency of the optical subassembly.

Embodiments associated with individual optical receiver module and optical transmitter module have been described hereinabove. It is apparent to those having ordinary skills of the art to combine these embodiments together to form an optical subassembly that features both transmission and reception of optical signals, while possessing the advantages provided by the active and passive alignments in accordance with the present invention.

It is apparent that the present invention has at least the followings advantages:

(1) The optical subassembly of the present invention provides a novel design of optical path, which effectively shortens the length of the optical path and thus making the subassembly compact. The novel design, together with active alignment, allows for active adjustment to enhance the coupling efficiency of the optical transceiver module.

(2) The active alignment provided by the present invention effectively compensates errors of assembling and manufacturing optical parts, such as lens, thin film filter, optical fiber receptacle or connector, and bases for laser diode device and photo detector device.

(3) The present invention provides optimum coupling efficiency for light sources of different wavelengths to eventually optimize the coupling efficiency of the whole system.

Although the present invention has been described with reference to the preferred embodiment thereof, it is apparent to those skilled in the art that a variety of modifications and changes may be made, for example replacing the bowl with a fork, without departing from the scope of the present invention which is intended to be defined by the appended claims.

What is claimed is:

1. An optical subassembly of optical transceiver comprising an optical transmitter module, the optical transmitter module further comprising:
   a body having opposite top and bottom surfaces, the body defining a first through hole extending between the top and bottom surfaces;
   a light source generation device, comprising a base supporting a first light generator comprising a light source, which selectively emits a first optical signal of a first wavelength, the base being attached to the bottom surface of the body whereby the first optical signal from the light source travels through the first through hole; and
   an adjustor, mounted to the top surface of the body at a location adjacent to the first through hole, the adjustor comprising a reflector corresponding in position to the first through hole and inclined at an angle with respect to an axis of the first through hole, in order to reflect and redirect the first optical signal that travels through the first through hole to an optical path that extends through a passage defined in the body;

wherein the adjustor is movable with respect to the body and comprises a first member that is rotatable about a first rotation axis and a second member that is mounted to the first member and is rotatable about a second rotation axis that is not coincident with and not parallel to the first rotation axis to effect adjustment of the inclining angle of the reflector with respect to the axis of the first through hole.

2. The optical subassembly of optical transceiver as claimed in claim 1, wherein the bottom surface of the body defines a positioning recess for receiving and positioning the first light generator of the light source generation device.

3. The optical subassembly of optical transceiver as claimed in claim 2 further comprising a lens assembly arranged in the first through hole, serving as a collimating device for converting the optical signal from the first light generator into parallel ray, and wherein the positioning recess has a depth determined in accordance with the first wavelength whereby the first optical signal that is converted into parallel ray is properly projected onto the reflector.

4. The optical subassembly of optical transceiver as claimed in claim 3, wherein the lens assembly comprises at least one lens, on which a wavelength-selecting anti-reflection film is coated.

5. The optical subassembly of optical transceiver as claimed in claim 1 further comprising an optical fiber receptacle mounted to the top surface of the body to receive an optical fiber with the optical path runs through the optical fiber.

6. The optical subassembly of optical transceiver as claimed in claim 1, wherein the first rotation axis is substantially normal to the top surface of the body and the second rotation axis is substantially parallel to the top surface of the body.

7. The optical subassembly of optical transceiver as claimed in claim 6, wherein the top surface of the body defines a hole, the first member of the adjustor comprising a first pivot extending in a vertical direction and fit in the hole and rotatable about the first rotation axis with respect to the hole, and wherein the first member comprises a second pivot extending therefrom in a horizontal direction, the second member defining a bore fit over the second pivot to effect rotation of the second member about the second rotation axis with respect to the second pivot to adjust the inclining angle of the reflector.

8. The optical subassembly of optical transceiver as claimed in claim 1, wherein the body defines first and second through holes, and wherein the light source generation device comprises first and second light generators, each comprising a light source to emit first and second optical signals of first and second wavelengths, respectively, the first and second optical signals traveling through the first and second through holes respectively, the body comprising an adjustor associated with each through hole, and each adjustor carrying a reflector that is inclined at an angle to respectively reflect and redirect the first and second optical signals to the optical path.

9. The optical subassembly of optical transceiver as claimed in claim 8, wherein the top surface of the body is optionally provided with a reflection device for selectively coupling the optical signals onto the optical path.

10. The optical subassembly of optical transceiver as claimed in claim 9, wherein the reflection device comprises a thin film filter.

11. The optical subassembly of optical transceiver as claimed in claim 1, wherein the body defines a plurality of through holes and wherein the light source generation device comprises a plurality of light generators, each comprising a light source to emit a plurality of optical signals having different wavelengths to travel through the through holes respectively, the body comprising an adjustor associated with each through hole, and each adjustor carrying a reflector that is inclined at an angle to respectively reflect and redirect the optical signals, wherein one of the reflector redirects the associated optical signal to the optical path directly, and the remaining reflectors selectively redirect the associated optical signals to at least one of a plurality of thin film filters mounted on the body to couple the associated optical signals to the optical path indirectly.

12. The optical subassembly of optical transceiver as claimed in claim 1, wherein the light source of the light source generation device comprises a laser source.

13. The optical subassembly of optical transceiver as claimed in claim 12, wherein optical signal generated by the laser source has a wavelength within the wavebands for both short distance and long haul communication.

14. The optical subassembly of optical transceiver as claimed in claim 5 further comprising a passage lens arranged in the optical path to couple the optical signal traveling along the optical path into the optical fiber.

15. An optical subassembly of optical transceiver comprising an optical receiver module, the optical receiver module further comprising:
a body having opposite top and bottom surfaces, the body defining a first through hole extending between the top and bottom surfaces;
an adjustor, mounted to the top surface of the body at a location adjacent to the first through hole, the adjustor comprising a reflector corresponding in position to the first through hole and inclined at an angle with respect to an axis of the first through hole, in order to reflect and redirect a first incident optical signal having a first wavelength through the first through hole; and
a photo detection device, comprising a base supporting a first photo detector comprising a light sensing element, which detects the first incident optical signal of the first wavelength, the base being attached to the bottom surface of the body whereby the first optical signal travels through the first through hole and radiates on the light sensing element;
wherein the adjustor is movable with respect to the body and comprises a first member that is rotatable about a first rotation axis and a second member that is mounted to the first member and is rotatable about a second rotation axis that is not coincident with and not parallel to the first rotation axis to effect adjustment of the inclining angle of the reflector with respect to the axis of the first through hole.

16. The optical subassembly of optical transceiver as claimed in claim 15, wherein the bottom surface of the body defines a positioning recess for receiving and positioning the first photo detector of the photo detection device.

17. The optical subassembly of optical transceiver as claimed in claim 16 further comprising a lens assembly arranged in the first through hole for focusing the first optical signal onto the light sensing element, and wherein the positioning recess has a depth determined in accordance with the first wavelength whereby the first optical signal is precisely focused onto the light sensing element.

18. The optical subassembly of optical transceiver as claimed in claim 17, wherein the lens assembly comprises at least one lens, on which a wavelength-selecting anti-reflection film is coated.

19. The optical subassembly of optical transceiver as claimed in claim 15 further comprising an optical fiber receptacle mounted to the top surface of the body to receive an optical fiber through which the first incident optical signal travels into a passage formed in the body to be guided toward the reflector.

20. The optical subassembly of optical transceiver as claimed in claim 15, wherein the first rotation axis is substantially normal to the top surface of the body and the second rotation axis is substantially parallel to the top surface of the body.

21. The optical subassembly of optical transceiver as claimed in claim 20, wherein the top surface of the body defines a hole, the first member of the adjustor comprising a first pivot extending in a vertical direction and fit in the hole and rotatable about the first rotation axis with respect to the hole, and wherein the first member comprises a second pivot extending therefrom in a horizontal direction, the second member defining a bore fit over the second pivot to effect rotation of the second member about the second rotation axis with respect to the second pivot to adjust the inclining angle of the reflector.

22. The optical subassembly of optical transceiver as claimed in claim 15, wherein the body defines first and second through holes each associated with an adjustor, each adjustor carrying a reflector that is inclined at an angle to reflect and redirect first and second incident optical signals through the first and second through holes respectively, the photo detection device comprising first and second photo detectors, each comprising a light sensing element to detect the first and second optical signals of first and second wavelengths, respectively.

23. The optical subassembly of optical transceiver as claimed in claim 22, wherein the top surface of the body is optionally provided with a splitting device for selectively decoupling and directing the optical signals to the reflectors of the associated adjustors.

24. The optical subassembly of optical transceiver as claimed in claim 23, wherein the splitting device comprises a thin film filter.

25. The optical subassembly of optical transceiver as claimed in claim 15, wherein the body defines a plurality of through holes each associated with an adjustor, each adjustor comprising a reflector inclined at an angle to reflect and redirect a plurality of incident optical signals of different wavelengths through the through holes respectively, the photo detection device comprising a plurality of photo detectors, each comprising a light sensing element to detect the incident optical signals and generating in response thereto corresponding electrical signals, the body comprising thin film filters to separate the optic signals one by one, each separated optic signal being reflected by the reflector of the associated adjustor respectively to pass through the associated through hole and reach the associated light sensing element to be converted in to corresponding electrical signal, while the remaining optic signals are reflected and redirected by the thin film filters to undergo further separation by the other thin film filters.

26. The optical subassembly of optical transceiver as claimed in claim 15, wherein the photo detector of the photo detection device comprises a photo diode.

27. The optical subassembly of optical transceiver as claimed in claim 19 further comprising a passage lens arranged in the passage, serving as a collimating device, to convert the incident optic signal into parallel ray traveling through the passage.

* * * * *